(12) United States Patent
Paulson et al.

(10) Patent No.: US 9,981,736 B2
(45) Date of Patent: May 29, 2018

(54) FOLDING PROPROTOR BLADE ASSEMBLY HAVING INTEGRAL TANG ASSEMBLY

(71) Applicant: Bell Helicopter Textron Inc., Fort Worth, TX (US)

(72) Inventors: Jared Mark Paulson, Fort Worth, TX (US); Paul K. Oldroyd, Fort Worth, TX (US); Christopher Foskey, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 163 days.

(21) Appl. No.: 15/156,224

(22) Filed: May 16, 2016

(65) Prior Publication Data

US 2017/0327205 A1 Nov. 16, 2017

(51) Int. Cl.
*B64C 27/52* (2006.01)
*B64C 11/28* (2006.01)
*B64C 11/26* (2006.01)
*B64C 29/00* (2006.01)

(52) U.S. Cl.
CPC .............. *B64C 11/28* (2013.01); *B64C 11/26* (2013.01); *B64C 29/0033* (2013.01)

(58) Field of Classification Search
CPC ......... B64C 11/16; B64C 11/20; B64C 11/22; B64C 11/24; B64C 11/26; B64C 11/28; B64C 11/205; B64C 29/0033; B64C 27/48; B64C 2027/4733; B64C 2027/4736
See application file for complete search history.

(56) References Cited

U.S. PATENT DOCUMENTS

| 4,022,546 A * | 5/1977 | Drees .................... B64C 27/463 416/226 |
| 5,939,007 A | 8/1999 | Iszczyszyn et al. |
| 7,594,625 B2 | 9/2009 | Robertson et al. |
| 8,353,673 B2 | 1/2013 | Leahy et al. |

(Continued)

FOREIGN PATENT DOCUMENTS

| DE | 3003906 A1 | 9/1980 |
| GB | 605748 A | 7/1948 |

(Continued)

OTHER PUBLICATIONS

European Search Report, Application No. 16173572.5, European Patent Office, dated Sep. 15, 2017.

(Continued)

*Primary Examiner* — Richard G Davis
(74) *Attorney, Agent, or Firm* — Lawrence Youst PLLC

(57) ABSTRACT

A tiltrotor aircraft includes a fuselage, a wing member extending from the fuselage, an engine disposed relative to the wing member, a rotor hub assembly mechanically coupled to the engine and a plurality of proprotor blade assemblies rotatably mounted to the rotor hub assembly and operable for beamwise folding relative thereto. The proprotor blade assemblies each including a spar and a sheath extending spanwise along a leading edge of the spar. The spar has a root section, a main section and a tip section. The spar has a generally oval cross section at radial stations along the main section of the spar with the root section of the spar forming an integral tang assembly operable for coupling the spar to the rotor hub assembly.

16 Claims, 11 Drawing Sheets

(56) References Cited

U.S. PATENT DOCUMENTS

| | | | |
|---|---|---|---|
| 9,174,731 B2 | 11/2015 | Ross et al. | |
| 2009/0269205 A1* | 10/2009 | Leahy | B64C 27/463 |
| | | | 416/226 |
| 2011/0211968 A1* | 9/2011 | Simkulak | B64C 27/463 |
| | | | 416/226 |
| 2014/0271215 A1* | 9/2014 | Measom | B23P 15/04 |
| | | | 416/224 |
| 2015/0030458 A1 | 1/2015 | Nissen | |
| 2015/0232175 A1 | 8/2015 | Kizhakkepat et al. | |

FOREIGN PATENT DOCUMENTS

| | | |
|---|---|---|
| GB | 909617 A | 10/1962 |
| WO | 1991005700 A1 | 5/1991 |
| WO | 1996006776 A1 | 3/1996 |

OTHER PUBLICATIONS

European Examination Report, Application No. 16173572.5, European Patent Office, dated Oct. 10, 2017.

* cited by examiner

FOLDING PROPROTOR BLADE ASSEMBLY HAVING INTEGRAL TANG ASSEMBLY

TECHNICAL FIELD OF THE DISCLOSURE

The present disclosure relates, in general, to a rotor blade assembly operable for use on a rotorcraft and, in particular, to a folding proprotor blade assembly having an integral tang assembly operable for use on a rotorcraft.

BACKGROUND

Tiltrotor aircraft typically include multiple rotor assemblies that are carried by the wing member of the aircraft and are generally disposed near the end portions of the wing member. Each rotor assembly may include an engine and transmission that provide torque and rotational energy to a drive shaft that rotates a proprotor including a plurality of proprotor blade assemblies. Typically, the rotor assemblies are capable of moving or rotating relative to the wing member enabling the tiltrotor aircraft to operate between a helicopter mode, in which the rotor assemblies are tilted upward, such that the tiltrotor aircraft flies much like a conventional helicopter and an airplane mode, in which the rotor assemblies are tilted forward, such that the tiltrotor aircraft flies much like a conventional propeller driven aircraft. In this manner, the proprotors generate greater lift in helicopter mode than in airplane mode, as the proprotors are oriented to generate greater thrust propelling the aircraft vertically. Likewise, the proprotors generate greater forward speed in airplane mode than in helicopter mode, as the proprotors are oriented to generate greater thrust propelling the aircraft forward.

In conventional tiltrotor aircraft, the proprotor blade assemblies include a D-shaped spar having the bulk of its structure biased forward, offering favorable structural coupling and mass properties. Unfortunately, D-shaped spars are structurally complex having tight internal radii and complicated material transitions resulting in a component that is particularly difficult, time consuming and expensive to manufacture. Accordingly, a need has arisen for an improved proprotor blade assembly having a spar with a less complex structure that is simpler, less expensive and less time consuming to manufacture.

SUMMARY

In a first aspect, the present disclosure is directed to a proprotor blade assembly operable for beamwise folding relative to a rotor hub assembly. The proprotor blade assembly includes a spar and a sheath extending spanwise along a leading edge of the spar. The spar has a root section, a main section and a tip section. The spar has a generally oval cross section at radial stations along the main section of the spar with the root section forming an integral tang assembly operable for coupling the spar to the rotor hub assembly.

In some embodiments, the integral tang assembly may include a first tang member and an oppositely disposed second tang member forming an inboard portion of the root section of the spar, wherein each of the tang members may have a hub mount aperture and may have substantially the same wall thickness. In certain embodiments, the wall thickness of the spar is thickest in the integral tang assembly. In some embodiments, the integral tang assembly may be a monolithic structure together with the root section and main section of the spar and may be formed together with the root section and main section of the spar. In certain embodiments, the integral tang assembly is formed on the spar using a material removal process such as a machining process.

In some embodiments, the spar may have a first edge and a generally oppositely disposed second edge, wherein the first edge has a structural bias relative to the second edge at the radial stations along the main section of the spar. In such embodiments, the first edge of the spar may be the leading edge of the spar. Also, in such embodiments, the thickness of the first edge of the spar may be greater than the thickness of the second edge of the spar at the radial stations along the main section of the spar. In certain embodiments, the thickness of the first edge of the spar may progressively increase relative to the thickness of the second edge of the spar at radial stations along the main section of the spar up to about mid span and/or the thickness of the first edge of the spar may be substantially constant relative to the thickness of the second edge of the spar at radial stations along the main section of the spar beginning at about mid span. In some embodiments, the thickness of the first edge of the spar may be between about 80% and about 120% greater than the thickness of the second edge of the spar at the radial stations along the main section of the spar beginning at about mid span. In certain embodiments, the spar may be a monolithic structure formed by curing a plurality of material layers such as a plurality of broad goods layers. In some embodiments, the sheath may be a structural member of the proprotor blade assembly.

In a second aspect, the present disclosure is directed to a tiltrotor aircraft. The tiltrotor aircraft includes a fuselage, a wing member extending from the fuselage, an engine disposed relative to the wing member, a rotor hub assembly mechanically coupled to the engine and a plurality of proprotor blade assemblies rotatably mounted to the rotor hub assembly and operable for beamwise folding relative thereto. The proprotor blade assemblies each include a spar and a sheath extending spanwise along a leading edge of the spar. The spar has a root section, a main section and a tip section. The spar has a generally oval cross section at radial stations along the main section of the spar with the root section of the spar forming an integral tang assembly operable for coupling the spar to the rotor hub assembly.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

Figure 1:
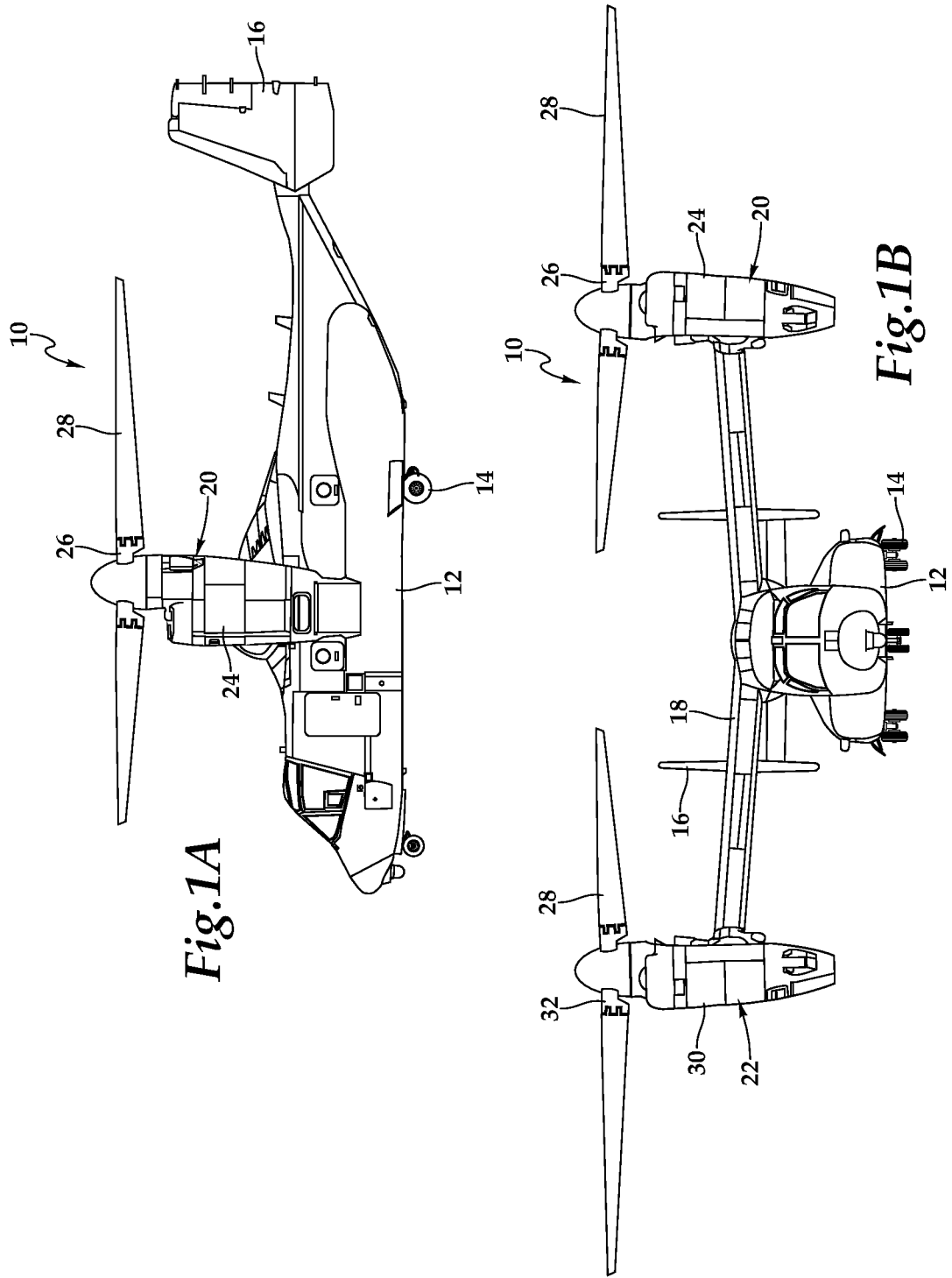
FIGS. 1A-1B are schematic illustrations of an exemplary tiltrotor aircraft in helicopter mode in accordance with embodiments of the present disclosure depicted in a side view and a front view, respectively.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIGS. 1A-1B, 2A-2B and 3A-3B in the drawings, a tiltrotor aircraft 10 is schematically illustrated. Tiltrotor aircraft 10 includes a fuselage 12, a landing gear 14, a tail member 16, a wing member 18 and rotor assemblies 20, 22. Rotor assembly 20 includes a nacelle 24 that houses an engine and transmission that provide torque and rotational energy to a drive shaft that rotates a rotor hub assembly 26 and a plurality of proprotor blade assemblies 28. Likewise, rotor assembly 22 includes a nacelle 30 that houses an engine and transmission that provide torque and rotational energy to a drive shaft that rotates a rotor hub assembly 32 and a plurality of proprotor blade assemblies 28. The position of rotor assemblies 20, 22, as well as the pitch of proprotor blade assemblies 28, is determined using a flight control system to selectively control the direction, thrust and lift of tiltrotor aircraft 10.

Figure 2:
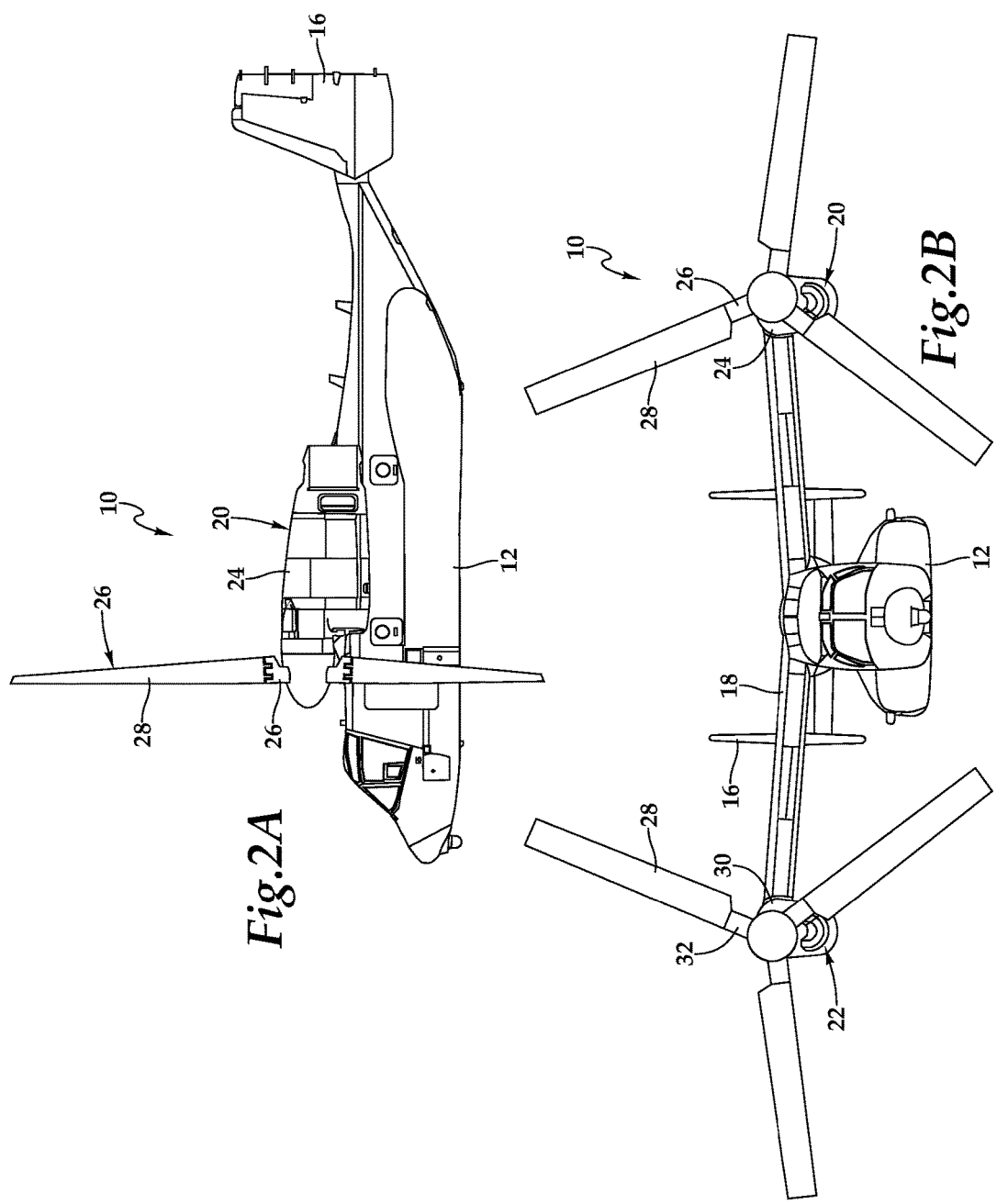
FIGS. 2A-2B are schematic illustrations of an exemplary tiltrotor aircraft in airplane mode in accordance with embodiments of the present disclosure depicted in a side view and a front view, respectively.
Figure 3:
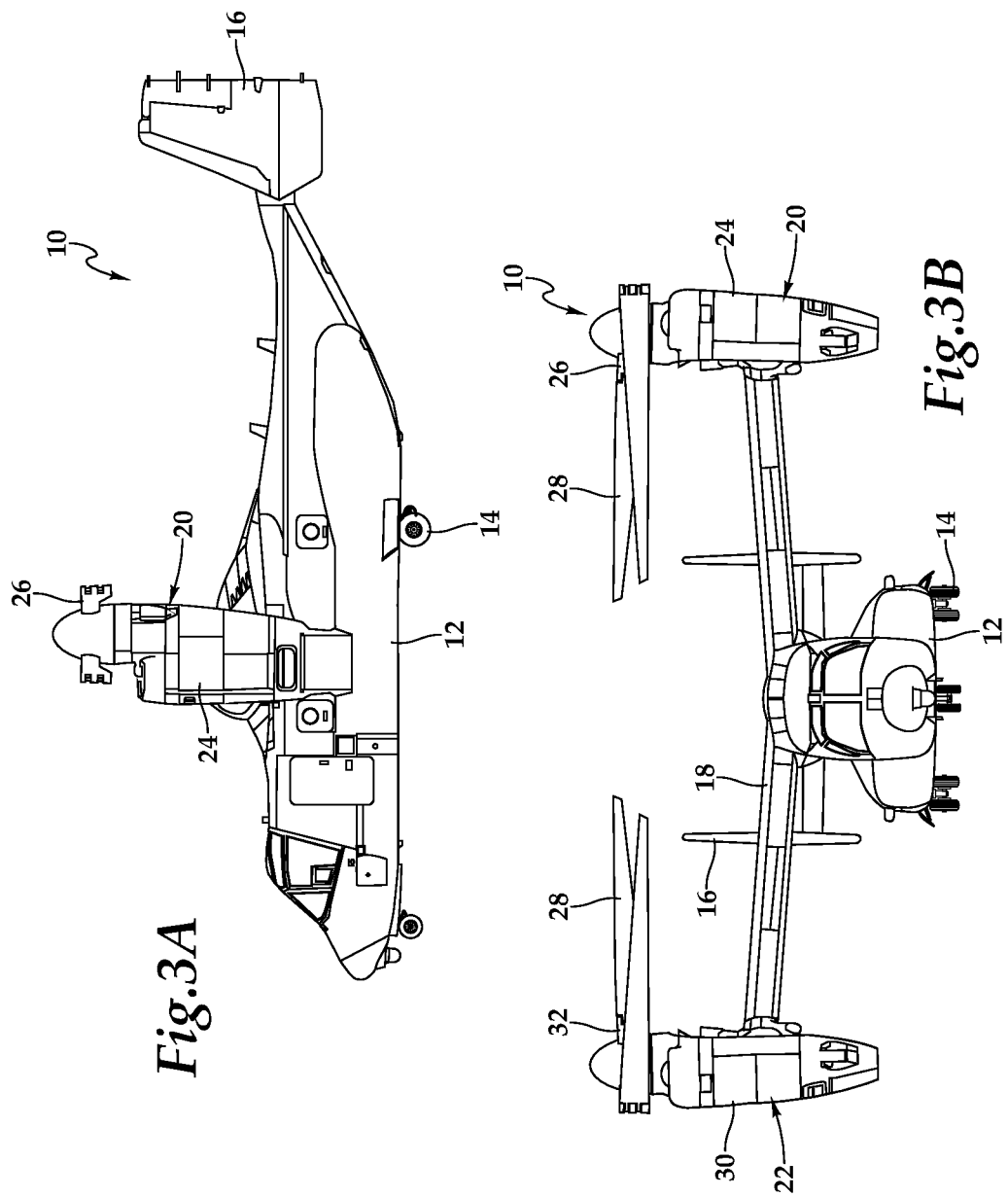
FIGS. 3A-3B are schematic illustrations of an exemplary tiltrotor aircraft with proprotor blade assemblies folded in accordance with embodiments of the present disclosure depicted in a side view and a front view, respectively.

FIGS. 1A-1B illustrate tiltrotor aircraft 10 in helicopter mode, in which rotor assemblies 20, 22 are positioned substantially vertical to provide a lifting thrust, such that tiltrotor aircraft 10 flies much like a conventional helicopter. FIGS. 2A-2B illustrate tiltrotor aircraft 10 in airplane mode, in which rotor assemblies 20, 22 are positioned substantially horizontal to provide a forward thrust in which a lifting force is supplied by wing member 18, such that tiltrotor aircraft 10 flies much like a conventional propeller driven aircraft. It should be appreciated that tiltrotor aircraft 10 can be operated such that rotor assemblies 20, 22 are selectively positioned between airplane mode and helicopter mode, which can be referred to as a conversion mode. FIGS. 3A-3B illustrate tiltrotor aircraft 10 during conversion to storage mode wherein certain of the proprotor blade assemblies 28 are folded in the beamwise direction, as illustrated, and wing member 18 is rotated approximately ninety degrees (not illustrated) such that wing member 28 is parallel with fuselage 12 to minimize the footprint of tiltrotor aircraft 10 for storage, for example, on an aircraft carrier.

Even though proprotor blade assemblies 28 of the present disclosure have been illustrated in the context of tiltrotor aircraft 10, it should be understood by those skilled in the art that proprotor blade assemblies 28 can be implemented in a variety of ways on a variety of rotorcraft including, for example, tiltwing aircraft, quad tiltrotor aircraft, unmanned aircraft and the like. As such, those skilled in the art will recognize that proprotor blade assemblies 28 can be integrated into a variety of rotorcraft configurations. In addition, even though proprotor blade assemblies 28 are depicted as being folded in the beamwise direction, it should be understood by those skilled in the art that proprotor blade assemblies 28 could be folded in other directions, for example, proprotor blade assemblies could alternatively be folded such that each proprotor blade assembly is generally parallel to its rotor assembly such that the tips of each proprotor blade assembly would generally point in the down direction of FIG. 1B or the aft direction of FIG. 2A.

Figure 4:
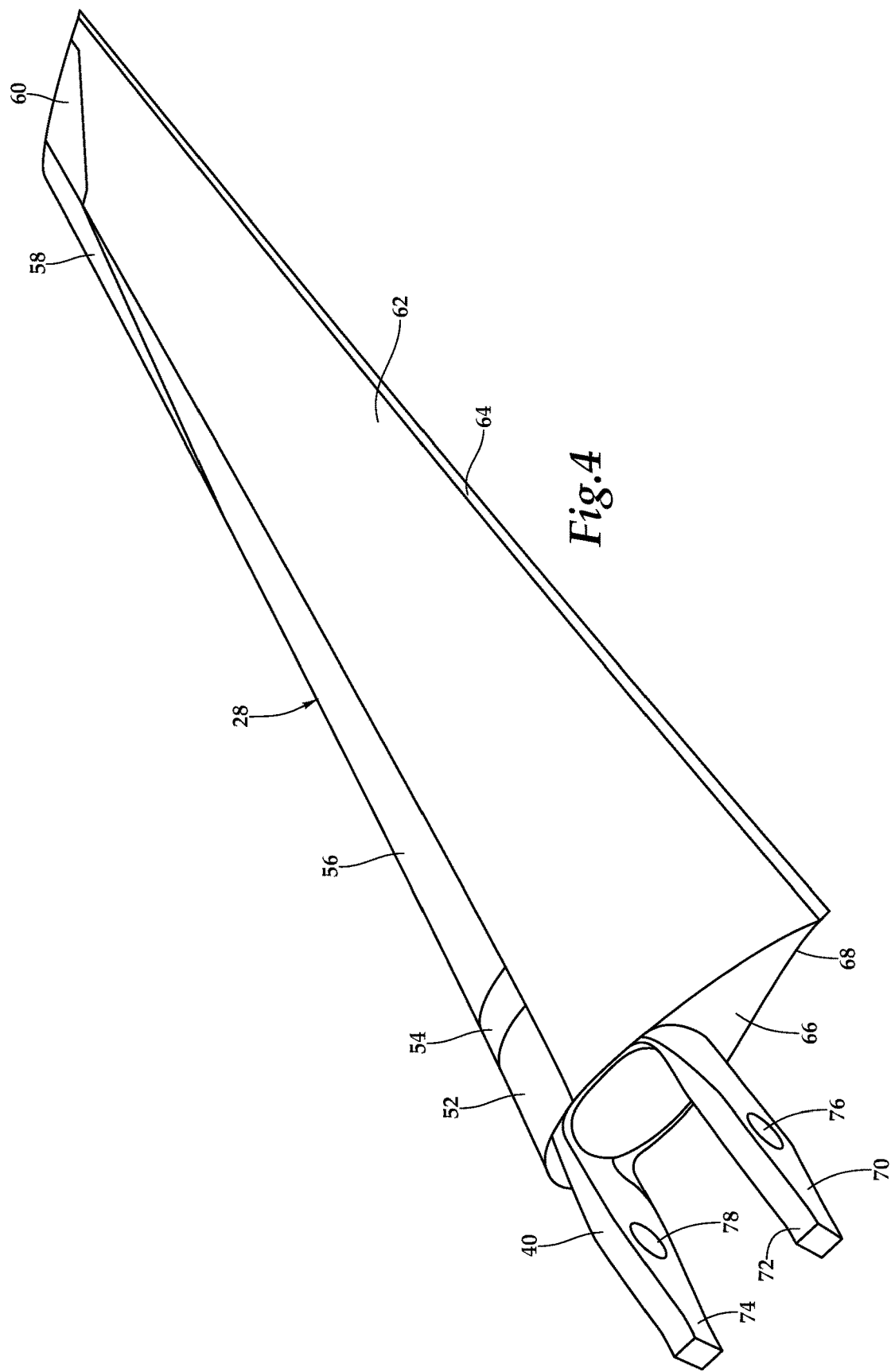
FIG. 4 is a top view of a proprotor blade assembly in accordance with embodiments of the present disclosure.
Figure 5:
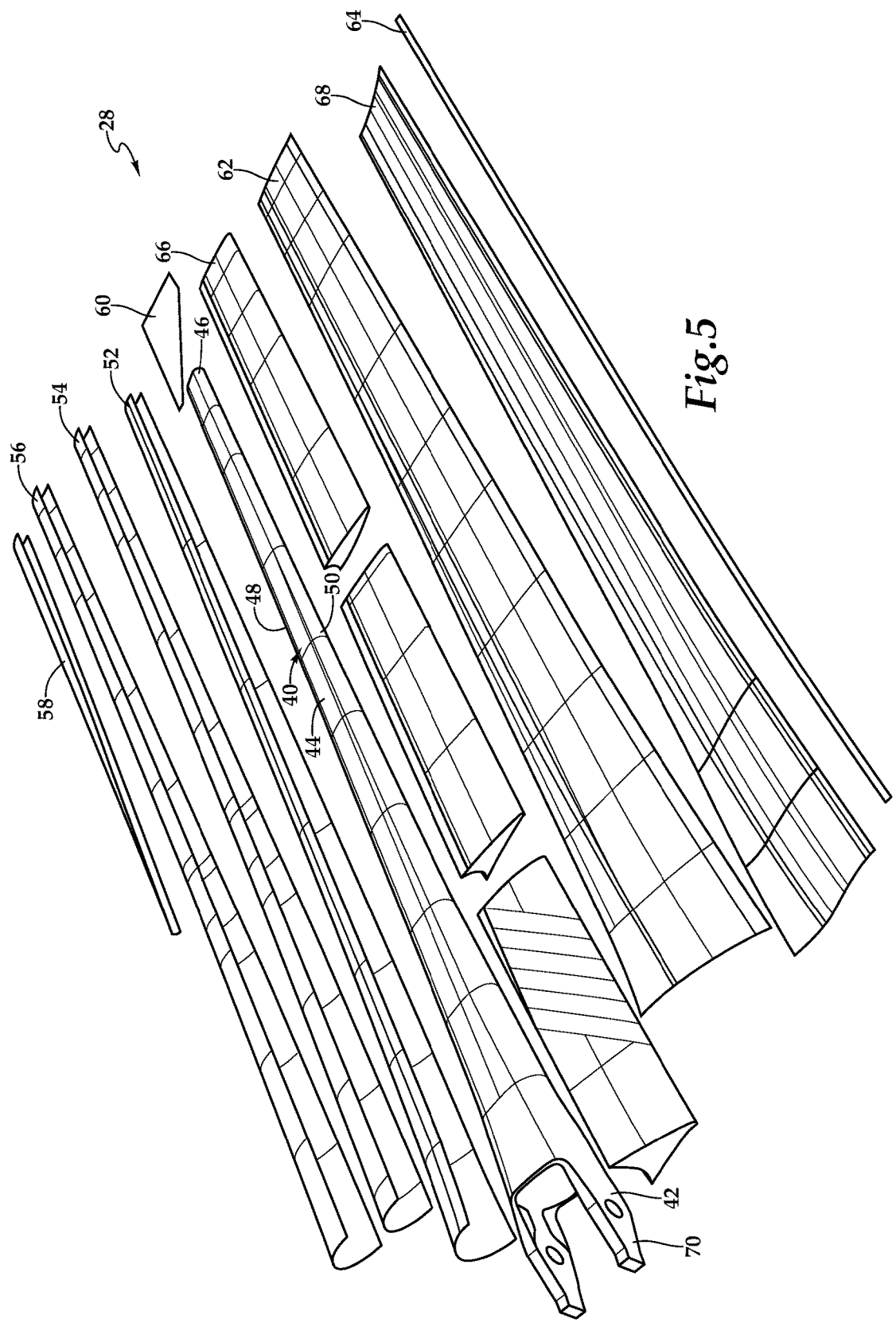
FIG. 5 is an exploded view of a proprotor blade assembly in accordance with embodiments of the present disclosure.
Figure 10:
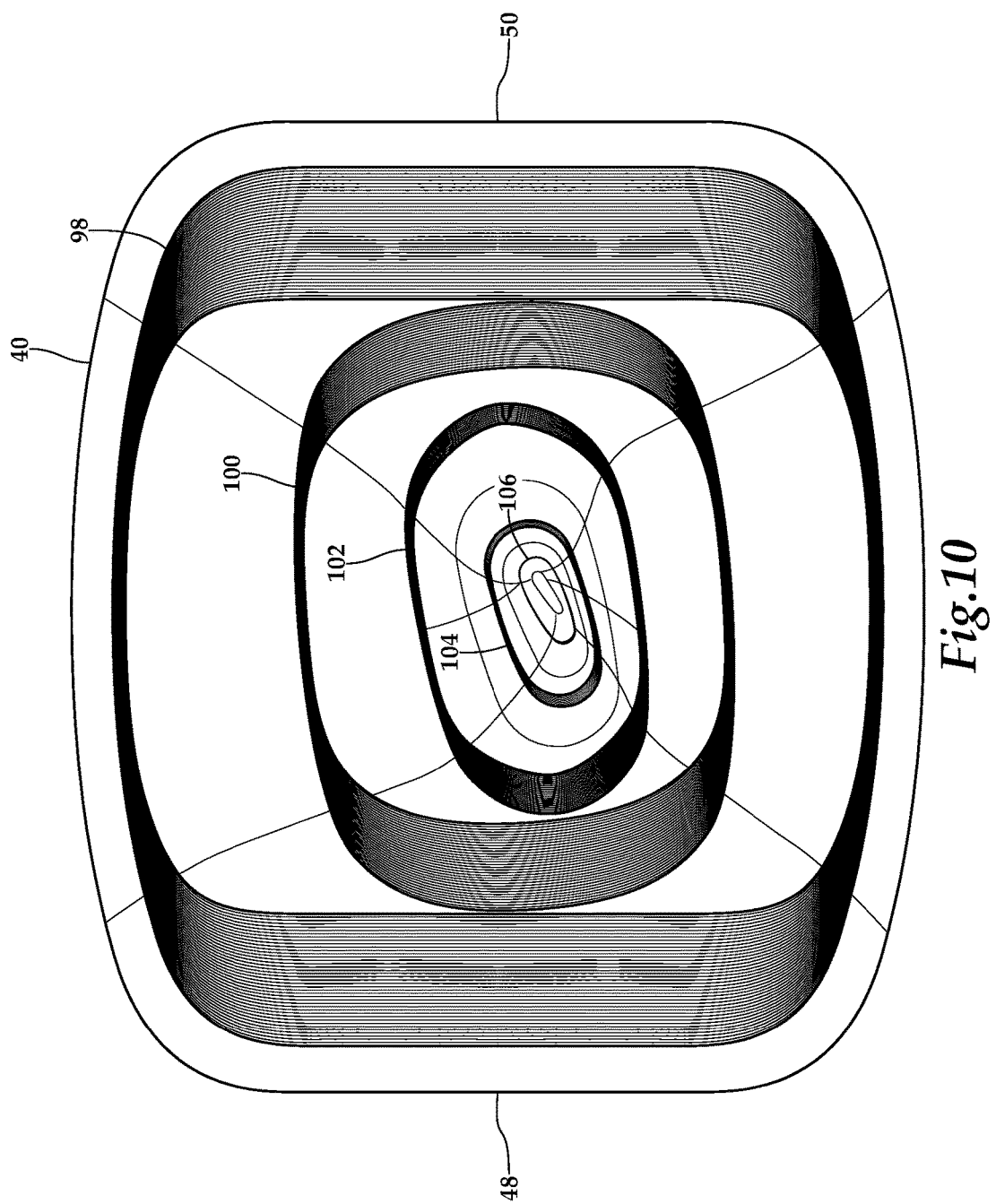
FIG. 10 is an end view including cross sections at various radial stations along a spar for use in a proprotor blade assembly in accordance with embodiments of the present disclosure.

Referring to FIGS. 4-5 in the drawings, a proprotor blade assembly 28 is illustrated. Proprotor blade assembly 28 includes a spar 40 that is the main structural member of proprotor blade assembly 28 designed to carry the primary centrifugal and bending loads of proprotor blade assembly 28. Spar 40 has a root section 42, a main section 44, a tip section 46, a leading edge 48 and a trailing edge 50. As illustrated, spar 40 has a root-to-tip twist on the order of about 30 degrees to about 40 degrees and preferably about 35 degrees (see also FIG. 10). As best seen in FIG. 5, spar 40 has a generally oval cross section along at least main section 44 of spar 40. Preferably, the interior of spar 40 has a simple geometric surface with smooth transitions between the forward wall 48, the upper and lower walls and the aft wall 50. In addition, spar 40 is preferably a monolithic structure formed using a broad goods and/or layered tape construction process having a manual or automated layup of a plurality of composite broad goods material layers such as fiberglass fabric, carbon fabric, fiberglass tape, carbon tape and combinations thereof, positioned over one or more mandrels having simple geometric surfaces with smooth transitions. After curing, the material layers form a high strength, lightweight solid composite member. As discussed in detail below, spar 40 has a forward structural bias. This is achieved by tailoring the material thickness along forward wall or leading edge 48 to be greater than the material thickness along aft wall or trailing edge 50 of spar 40 at certain radial stations along spar 40. This results in the shear center, the weight and the stiffness of spar 40 being biased forward.

A discrete sheath 52, a heater blanket 54 and an erosion prevention assembly including an abrasion resistant strip 56, an abrasion resistant cap 58 and an erosion shield 60 form the leading edge of proprotor blade assembly 28. As illustrated, sheath 52 has a generally C-shaped cross section and is securably attached spanwise to spar 40 using adhesive, curing or other suitable coupling technique. Sheath 52 is preferably a monolithic structure formed using a broad goods and/or layered tape construction process having a manual or automated layup of a plurality of composite broad goods material layers such as fiberglass fabric, carbon fabric, fiberglass tape, carbon tape and combinations thereof. After curing, the material layers form a high strength, lightweight solid composite member. Sheath 52 serves as a structural member of proprotor blade assembly 28 including providing shear stiffness to proprotor blade assembly 28. In addition, sheath 52 augments the forward bias of spar 40 to enhance the forward bias of proprotor blade assembly 28. Heater blanket 54 is disposed spanwise on the leading edge of sheath 52 and is securably attached thereto using adhesive or other suitable coupling technique. Heater blanket 54 is part of the de-icing system of tiltrotor aircraft 10 used to melt any ice that forms on proprotor blade assemblies 28. Abrasion resistant strip 56 is disposed spanwise on the leading edge of heater blanket 54 and is securably attached thereto using adhesive or other suitable coupling technique. Abrasion resistant strip 56 may be formed from a metal such as stainless steel or titanium and is designed to protect the other components of proprotor blade assembly 28 from erosion and impacts. In addition, abrasion resistant cap 58 and erosion shield 60 are disposed near the tip of proprotor blade assembly 28 to further enhance the erosion protection thereof. Abrasion resistant cap 58 is disposed spanwise on an outboard portion of the leading edge of abrasion resistant strip 56 and is securably attached thereto using adhesive or other suitable coupling technique. Abrasion resistant cap 58 may be formed from a metal such as stainless steel or a nickel alloy. Erosion shield 60 is disposed aft of abrasion resistant cap 58 on an outboard portion of the top of proprotor blade assembly 28 and is securably attached thereto using adhesive or other suitable coupling technique. Erosion shield 60 may be formed from a metal such as stainless steel or a nickel alloy.

Upper skin 62, wedge member 64, core 66 and lower skin 68 form the afterbody of proprotor blade assembly 28. Upper skin 62 and lower skin 68 are preferably monolithic structures formed using a broad goods and/or layered tape construction process having a manual or automated layup of a plurality of composite broad goods material layers such as fiberglass fabric, carbon fabric, fiberglass tape, carbon tape and combinations thereof. After curing, the material layers form high strength, lightweight solid composite members. Upper skin 62 and lower skin 68 serve as structural members of proprotor blade assembly 28 and are securably attached spanwise to spar 40 using adhesive, curing or other suitable coupling technique. Core 66 may be in the form of a nomex honeycomb structure disposed spanwise along trailing edge 50 of spar 40. Core 66 provides stability, compression resistance and shear transfer between upper skin 62 and lower skin 68. Wedge member 64 forms the trailing edge of proprotor blade assembly 28. Wedge member 64 is preferably a monolithic structure formed using a broad goods and/or layered tape construction process having a manual or automated layup of a plurality of composite broad goods material layers such as fiberglass fabric, carbon fabric, fiberglass tape, carbon tape and combinations thereof. After curing, the material layers form a high strength, lightweight solid composite member. Wedge member 64 serves as a structural member of proprotor blade assembly 28 including providing stiffness to proprotor blade assembly 28.

Figure 6:
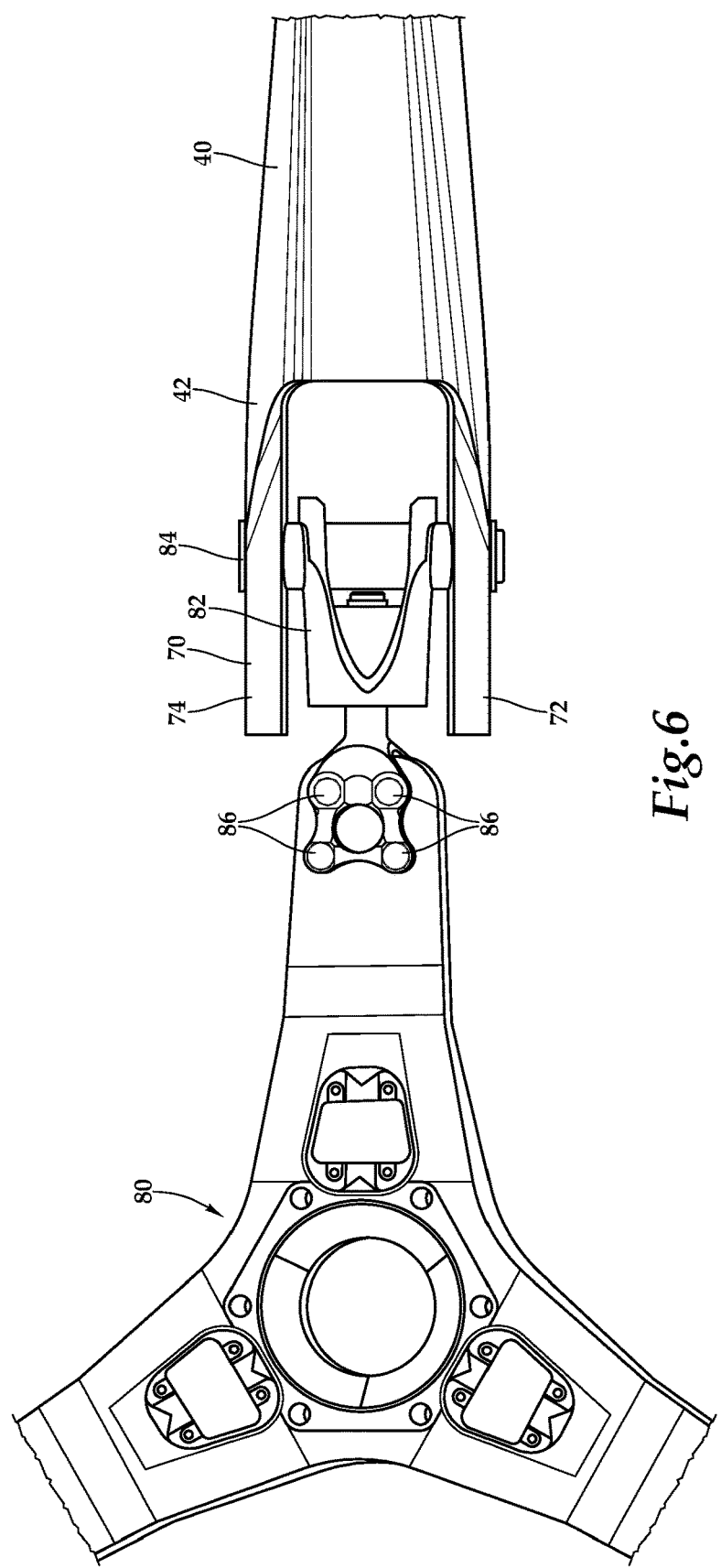
FIG. 6 is a cross sectional view of the root section of a proprotor blade assembly coupled to a rotor hub assembly in accordance with embodiments of the present disclosure.

As illustrated, spar 40 includes an integral tang assembly 70 having a pair of tang members 72, 74 forming an inboard portion of root section 42 of spar 40. Tang member 72 has a hub mount aperture 76 and tang member 74 has a hub mount aperture 78. As best seen in FIG. 6, tang assembly 70 enables spar 40 to be directly coupled with a rotor hub assembly 80 via a bearing assembly 82. As illustrated, spar 40 is coupled to bearing assembly 82 using a single pin connection 84. Bearing assembly 82 is coupled to rotor hub assembly 80 using a plurality of bolt connections 86. In operation, rotor hub assembly 80 is coupled to the engine and transmission via the drive shaft, thereby providing torque and rotational energy to rotate proprotor blade assembly 28. In addition, spar 40 is operable to rotate about pin connection 84 to enable tiltrotor aircraft 10 to convert from helicopter mode as best seen in FIGS. 1A-1B to storage mode as best seen in FIGS. 3A-3B wherein certain of the proprotor blade assemblies 28 are folded in the beamwise direction.

Figure 7:
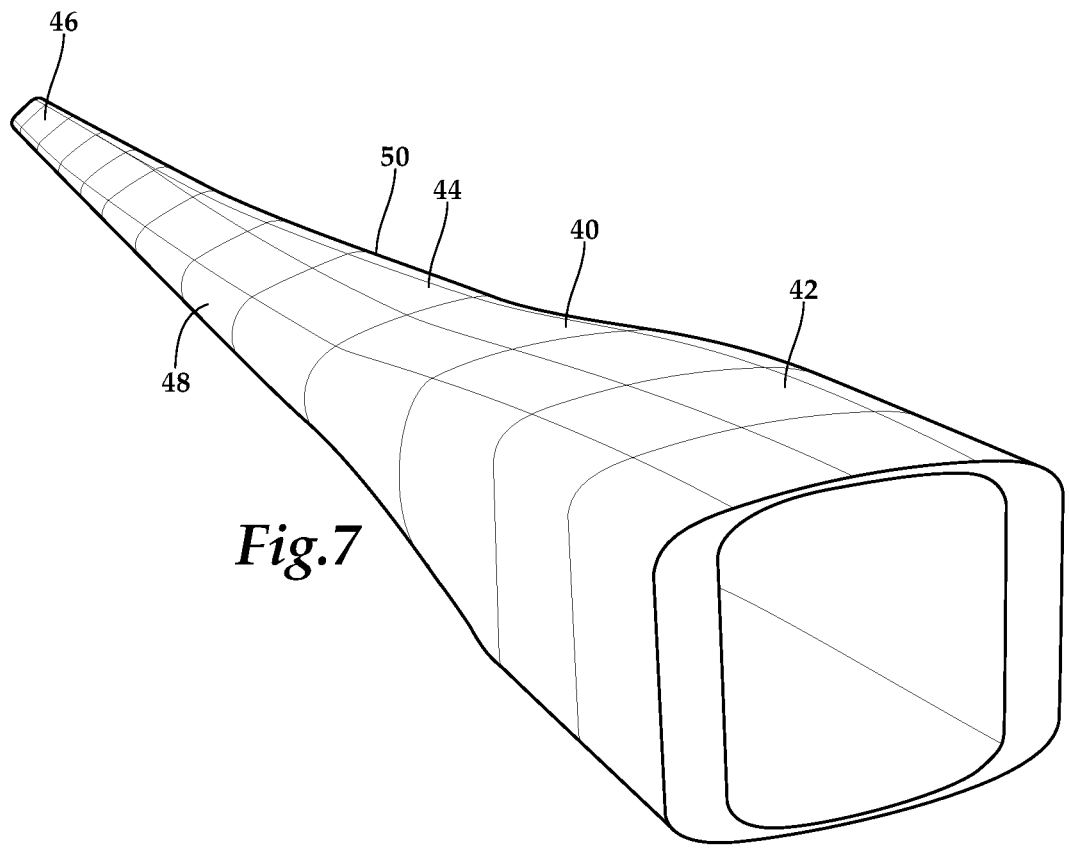
FIG. 7 is an isometric view of a spar for use in a proprotor blade assembly in accordance with embodiments of the present disclosure depicted in pre-machining configuration.

Referring now to FIG. 7 in the drawings, spar 40 is depicted. Spar 40 is the main structural member designed to carry the primary centrifugal and bending loads of proprotor blade assembly 28. Spar 40 has a root section 42, a main section 44, a tip section 46, a leading edge 48 and a trailing edge 50. Spar 40 is designed to have simple geometry that enables a broad goods construction process and preferably a broad goods construction process including a single layup and single cure. The use of simple geometric surfaces including linear surfaces, large radius arc length surfaces and/or near-ruled surfaces as well as smooth transitions therebetween improves the manufacturability of spar 40 allowing for an entirely automated broad goods layup or the combination of an automated and a manual broad goods layup. Alternatively, the broad goods layup could be performed using an entirely manual process. During the layup process to form spar 40, one or more mandrels are typically used to provide the surfaces for the broad goods layup. Spar 40 is formed from multiple layers of broad goods that are layup together and cured to form a monolithic structure. Preferably, spar 40 is manufactured using a single layup and single cure protocol. The broad goods for spar 40 may be in the form of fiberglass fabric, carbon fabric, fiberglass tape, carbon tape and combinations thereof, however, other lightweight and high strength materials could alternatively be used. Use of broad goods and particularly a single automated broad goods layup and single cure, not only enhances spar producibility and quality due to the reduced complexity of the manufacturing process, but also results in lower production costs, more efficient material usage, reduced labor hours and reduced energy consumption.

Figure 8:
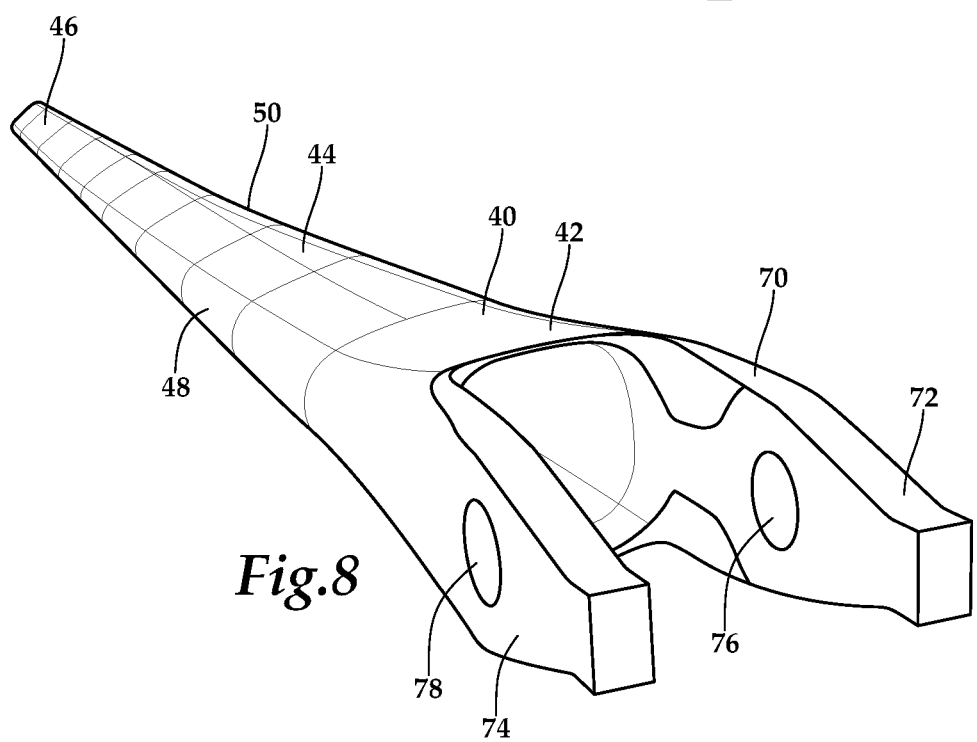
FIG. 8 is an isometric view of a spar for use in a proprotor blade assembly in accordance with embodiments of the present disclosure depicted in post-machining configuration.

As best seen in FIG. 8, once spar 40 has been cured, a material removal process, such as a machining process, may be used to form tang assembly 70 at the inboard end of spar 40. Specifically, spar 40 is machined to have tang member 72 with hub mount aperture 76 formed therethrough and tang member 74 with hub mount aperture 78 formed therethrough. In this manner, tang assembly 70 is formed together with and is a monolithic structure with spar 40 such that tang assembly 70 is considered to be integral with spar 40.

Referring additionally to FIGS. 9, 10 and 11A-11E of the drawings, therein is depicted various cross sectional representations of spar 40 in a pre-machined state (see FIG. 7) at a plurality of radial station along spar 40. As illustrated, spar 40 has a tubular cross section along its entire span including a generally oval cross section in main section 44. In the illustrated embodiment, forward wall 48 and aft wall 50 are thicker than the upper and lower surfaces of spar 40. With this implementation of spar 40, the majority of the centrifugal loads are carried by the structural material in forward wall 48 and aft wall 50 of spar 40 instead of in the structural material of the upper and lower surfaces as in conventional rotorcraft spars. This unique configuration is achieved by selectively locating one or more material layers spanwise along forward wall 48 and/or aft wall 50 for each torque wrap material layer that extends circumferentially around spar 40 during the layup process. This layup technique allows for specific tailoring of material thicknesses along forward wall 48 and aft wall 50.

Figure 9:
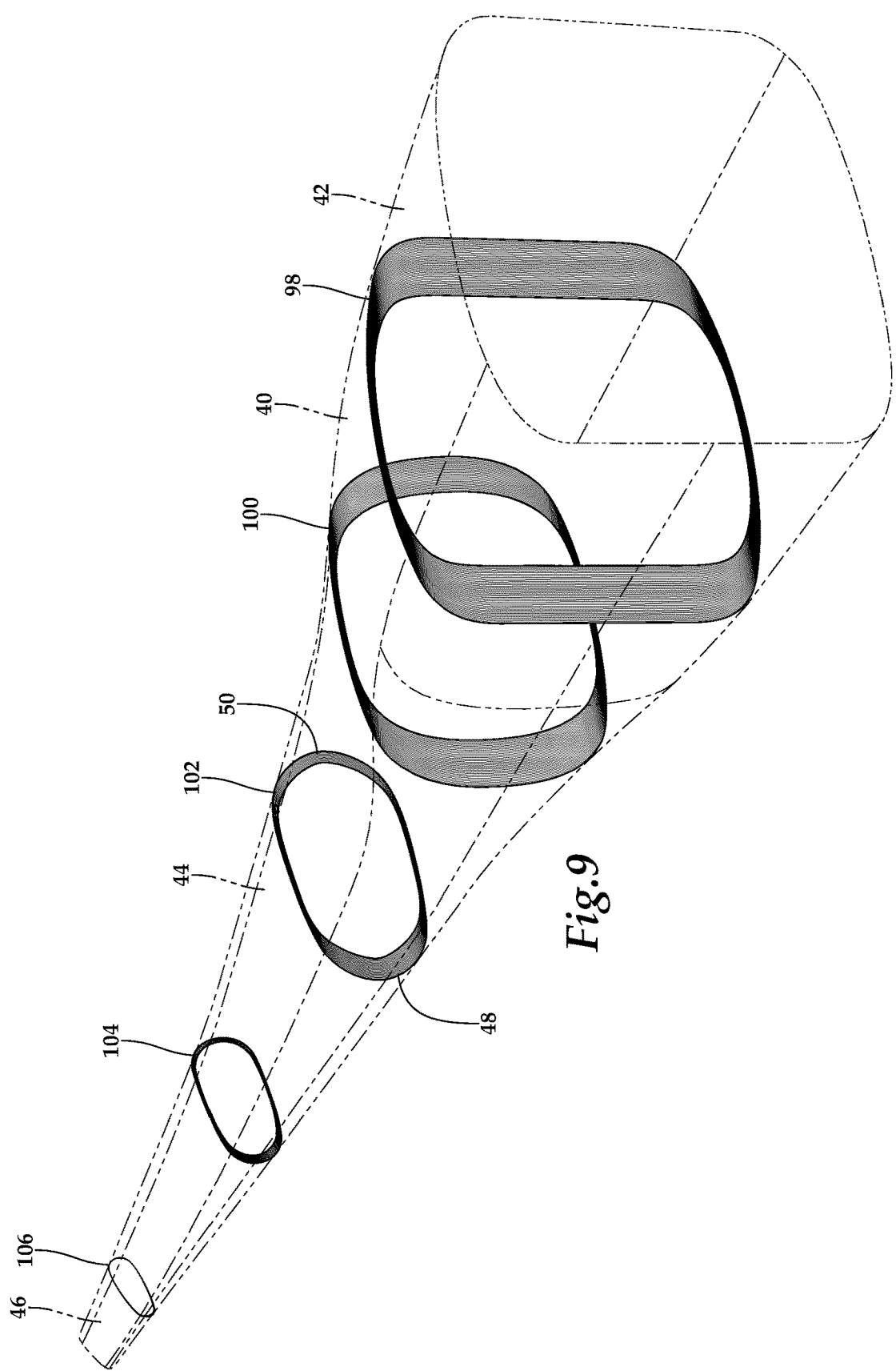
FIG. 9 is an isometric view including cross sections at various radial stations along a spar for use in a proprotor blade assembly in accordance with embodiments of the present disclosure.

For example, as best seen in FIG. 9, spar 40 is designed with spanwise taper in the thickness of forward wall 48 and aft wall 50. As illustrated, the thickness of forward wall 48 and aft wall 50 of spar 40 is greatest in root section 42 of spar 40, where spar 40 experiences the greatest centrifugal loads. The thickness of forward wall 48 and aft wall 50 of spar 40 is least near tip section 46 of spar 40, where spar 40 experiences significantly lower centrifugal loads. More specifically, the forward and aft spar wall thickness is greatest at the lower radial stations including, for example, at a radial station 98 of approximately two percent (2% r/R) located proximate hub mount aperture 76 of tang member 72 and hub mount aperture 78 of tang member 74 (see FIG. 8). Outboard from radial station 98, the spar wall thickness of forward wall 48 gradually tapers such that the forward wall thickness at a radial station 100 of approximately twenty five percent (25% r/R) is less than the forward spar wall thickness at radial station 98 but greater than the forward wall thickness at a radial station 102 of approximately fifty percent (50% r/R). Likewise, the forward wall thickness at a radial station 104 of approximately seventy five percent (75% r/R) is less than the forward wall thickness at radial station 102 but greater than the forward wall thickness at a radial station 106 of approximately ninety percent (90% r/R). Similarly, outboard from radial station 98, the spar wall thickness of aft wall 50 gradually tapers such that the aft wall thickness at radial station 100 of approximately twenty five percent (25% r/R) is less than the aft spar wall thickness at radial station 98 but greater than the aft wall thickness at radial station 102 of approximately fifty percent (50% r/R). Likewise, the aft wall thickness at radial station 104 of approximately seventy five percent (75% r/R) is less than the aft wall thickness at radial station 102 but greater than the aft wall thickness at radial station 106 of approximately ninety percent (90% r/R). It should be understood by those skilled in the art that the taper of the spar wall thickness may progress in a linear or non linear manner and may have different contours or slopes in different sections of the spar including sections having no taper. As such, it should be understood by those skilled in the art that the taper of the spar wall thickness, both forward and aft, will be determined based upon structural and dynamic analysis for the specific implementation.

Figure 11A:
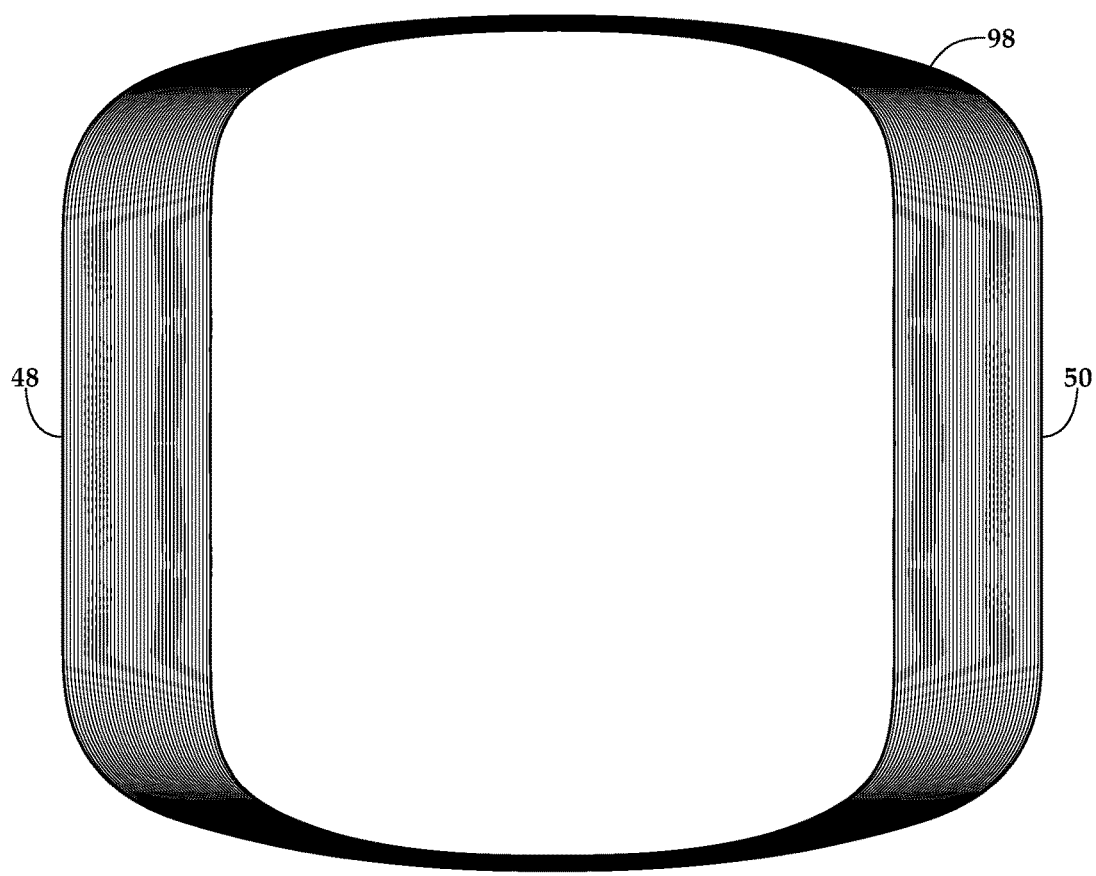
FIGS. 11A-11E are cross sectional views at various radial stations along a spar depicting the layup of broad goods used to form a spar in accordance with embodiments of the present disclosure.
Figure 11B:
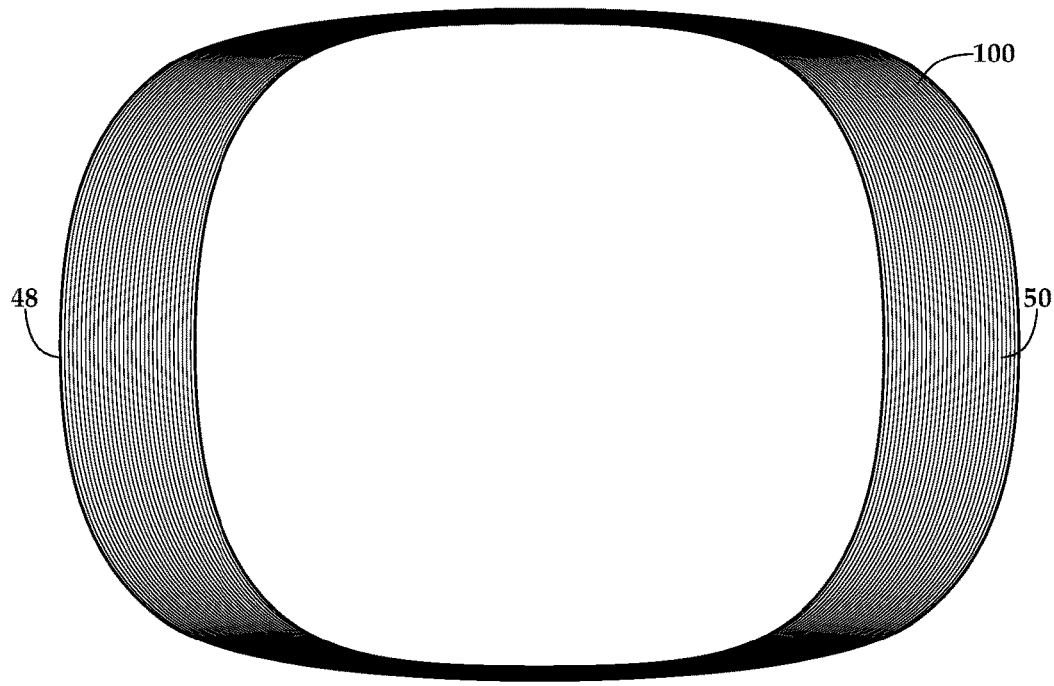
Figure 11C:
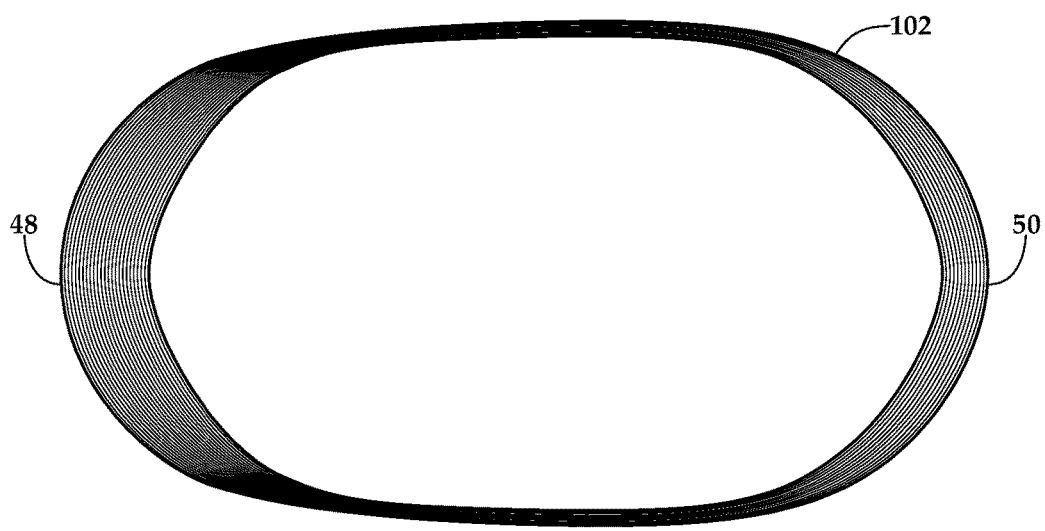
Figure 11D:
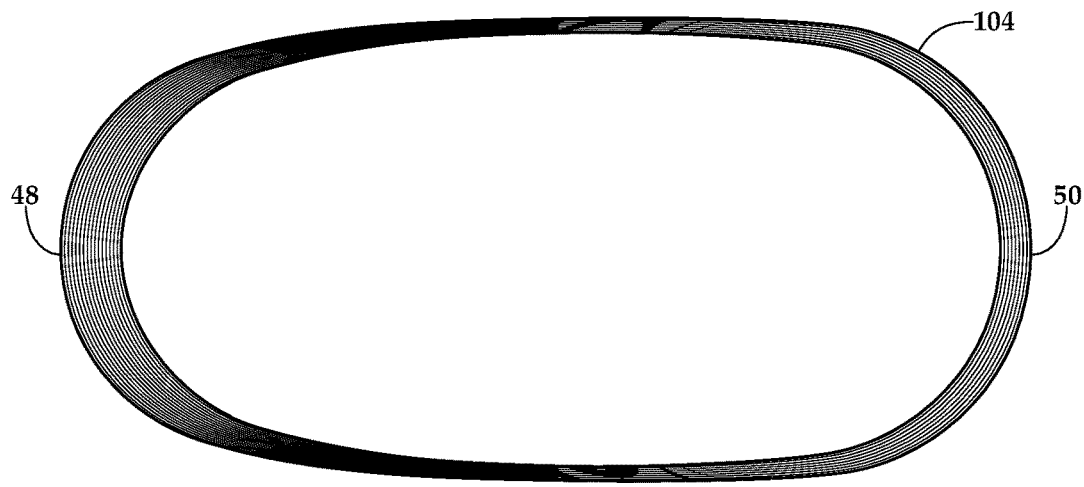
Figure 11E:
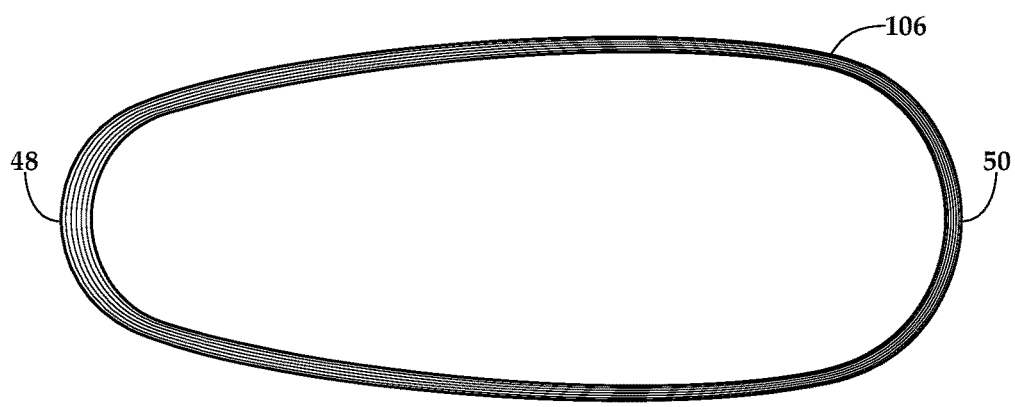

As illustrated, spar 40 has a generally oval cross section in main section 44 and includes a forward structural bias. It is noted that in root section 42, including tang assembly 70 (see FIG. 8) and at radial station 98 of approximately two percent (2% r/R), the forward wall thickness and the aft wall thickness are substantially the same, as best seen in FIG. 11A. As the spar wall thickness tapers toward tip section 46, the taper along forward wall 48 is different from the taper along aft wall 50. For example, at radial station 100 of approximately twenty five percent (25% r/R) the spar wall thickness of forward wall 48 is about 33% thicker than the spar wall thickness of aft wall 50, as best seen in FIG. 11B. The deviation in taper continues until about mid-spar, between about an inboard radial station of approximately forty five percent (45% r/R) and an outboard radial station of approximately fifty five percent (55% r/R). For example, at radial station 102 of approximately fifty percent (50% r/R) the spar wall thickness of forward wall 48 is about 100% thicker than the spar wall thickness of aft wall 50, as best seen in FIG. 11C. This relative thickness remains substantially constant through to tip section 46. For example, at radial station 104 of approximately seventy five percent (75% r/R) the spar wall thickness of forward wall 48 remains about 100% thicker than the spar wall thickness of aft wall 50, as best seen in FIG. 11D. Likewise, at radial station 106 of approximately ninety percent (90% r/R) the spar wall thickness of forward wall 48 remains about 100% thicker than the spar wall thickness of aft wall 50, as best seen in FIG. 11E.

It should be understood by those skilled in the art that the relative taper and spanwise contour of the forward and aft spar wall thicknesses may progress in a linear or non-linear manner and may have any desired slopes. In addition, even though specific relative thicknesses have been depicted and described for the forward wall thickness and aft wall thickness at particular radial stations, it is to be understood by those skilled in the art that other relative thicknesses both great than and less than those shown are possible and are considered within the scope of the present disclosure. For example, in the substantially constant relative thickness region between mid-spar and tip section 46, it may desirably to have the thickness of forward wall 48 between about 80% and about 120% greater than the thickness of aft wall 50. As such, it should be understood by those skilled in the art that the relative thicknesses of the forward and aft walls 48, 50, would be determined based upon structural and dynamic analysis for the specific implementation.

As illustrated, the forward structural bias of spar 40 is achieved by tailoring the material thickness along the forward wall or leading edge 48 to be greater than the material thickness along the aft wall or trailing edge 50, which results in the shear center, the weight and the stiffness of spar 40 being biased forward. In addition, even though spar 40 has been depicted and described as having a forward structural bias, it should be understood by those skilled in the art that a spar for use in a proprotor blade assembly could have alternate structural biases including, for example, an aft structural bias, an upper structural bias, a lower structural bias or other similar structural bias.

While this disclosure has been described with reference to illustrative embodiments, this description is not intended to be construed in a limiting sense. Various modifications and combinations of the illustrative embodiments as well as other embodiments will be apparent to persons skilled in the art upon reference to the description. It is, therefore, intended that the appended claims encompass any such modifications or embodiments.

What is claimed is:

1. A proprotor blade assembly operable for beamwise folding relative to a rotor hub assembly, the proprotor blade assembly comprising:
    a spar having a root section, a main section and a tip section, the spar having a generally oval cross section at radial stations along the main section, the root section forming an integral tang assembly operable for coupling the spar to the rotor hub assembly; and
    a sheath extending spanwise along a leading edge of the spar;
    wherein, the spar has a first edge and a generally oppositely disposed second edge, the first edge having a structural bias relative to the second edge at radial stations along the main section of the spar;
    wherein, the thickness of the first edge of the spar progressively increases relative to the thickness of the second edge of the spar at increasing radial stations along the main section of the spar up to about mid span; and
    wherein, the thickness of the first edge of the spar is substantially constant relative to the thickness of the second edge of the spar at increasing radial stations along the main section of the spar beginning at about mid span.

2. The proprotor blade assembly as recited in claim 1 wherein the integral tang assembly further comprises a first tang member and an oppositely disposed second tang member forming an inboard portion of the root section of the spar, each tang member having a hub mount aperture.

3. The proprotor blade assembly as recited in claim 2 wherein the first and second tang members have substantially the same wall thickness.

4. The proprotor blade assembly as recited in claim 1 wherein the wall thickness of the spar is thickest in the integral tang assembly.

5. The proprotor blade assembly as recited in claim 1 wherein the integral tang assembly is a monolithic structure together with the root section and main section of the spar.

6. The proprotor blade assembly as recited in claim 1 wherein the integral tang assembly is formed together with the root section and main section of the spar.

7. The proprotor blade assembly as recited in claim 1 wherein the integral tang assembly is formed on the spar using a material removal process.

8. The proprotor blade assembly as recited in claim 1 wherein the integral tang assembly is formed on the spar using a machining process.

9. The proprotor blade assembly as recited in claim 1 wherein the first edge of the spar is the leading edge of the spar.

10. The proprotor blade assembly as recited in claim 1 wherein the thickness of the first edge of the spar is greater than the thickness of the second edge of the spar at the radial stations along the main section of the spar.

11. The proprotor blade assembly as recited in claim 1 wherein the thickness of the first edge of the spar is between about 80% and about 120% greater than the thickness of the second edge of the spar at increasing radial stations along the main section of the spar beginning at about mid span.

12. The proprotor blade assembly as recited in claim 1 wherein the spar is a monolithic structure formed by curing a plurality of material layers.

13. The proprotor blade assembly as recited in claim 1 wherein the spar is a monolithic structure formed by curing a plurality of broad goods layers.

14. The proprotor blade assembly as recited in claim 1 wherein the sheath is a structural member of the proprotor blade assembly.

15. A rotorcraft, comprising:
    a fuselage;
    a wing member extending from the fuselage;
    an engine disposed relative to the wing member;
    a rotor hub assembly mechanically coupled to the engine; and
    a plurality of proprotor blade assemblies rotatably mounted to the rotor hub assembly and operable for beamwise folding relative thereto, each proprotor blade assembly comprising:
        a spar having a root section, a main section and a tip section, the spar having a generally oval cross section at radial stations along the main section, the root section forming an integral tang assembly operable for coupling the spar to the rotor hub assembly; and
        a sheath extending spanwise along a leading edge of the spar;
        wherein, the spar has a first edge and a generally oppositely disposed second edge, the first edge having a structural bias relative to the second edge at radial stations along the main section of the spar;
        wherein, the thickness of the first edge of the spar progressively increases relative to the thickness of the second edge of the spar at increasing radial stations along the main section of the spar up to about mid span; and
        wherein, the thickness of the first edge of the spar is substantially constant relative to the thickness of the second edge of the spar at increasing radial stations along the main section of the spar beginning at about mid span.

16. The rotorcraft as recited in claim 15 wherein the integral tang assembly further comprises a first tang member and an oppositely disposed second tang member forming an inboard portion of the root section of the spar, each tang member having a hub mount aperture.

* * * * *